Aug. 6, 1946.     O. K. BUTZBACH     2,405,135
TRANSMISSION
Filed July 5, 1940     2 Sheets-Sheet 1
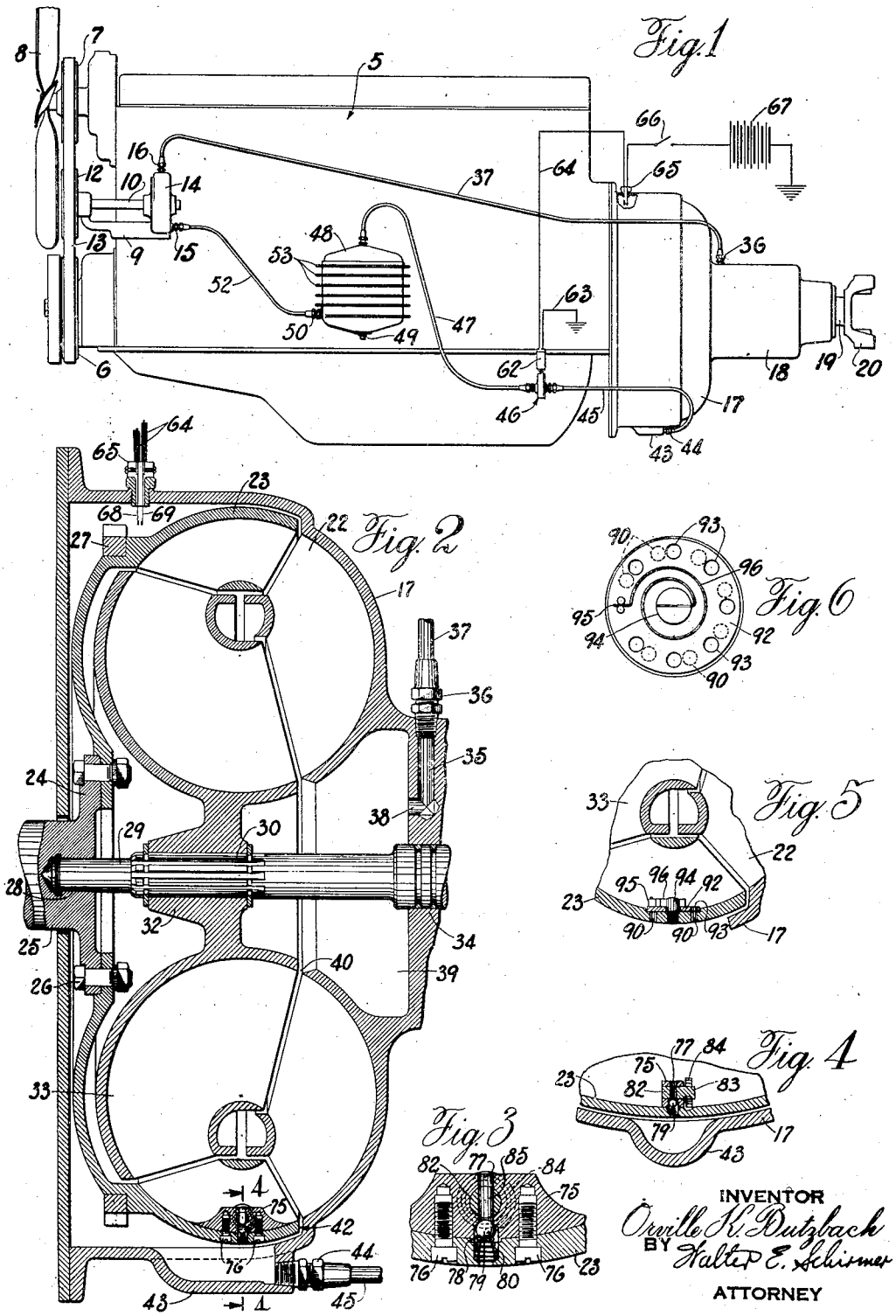
INVENTOR
Orville K. Butzbach
BY Walter E. Schirmer
ATTORNEY

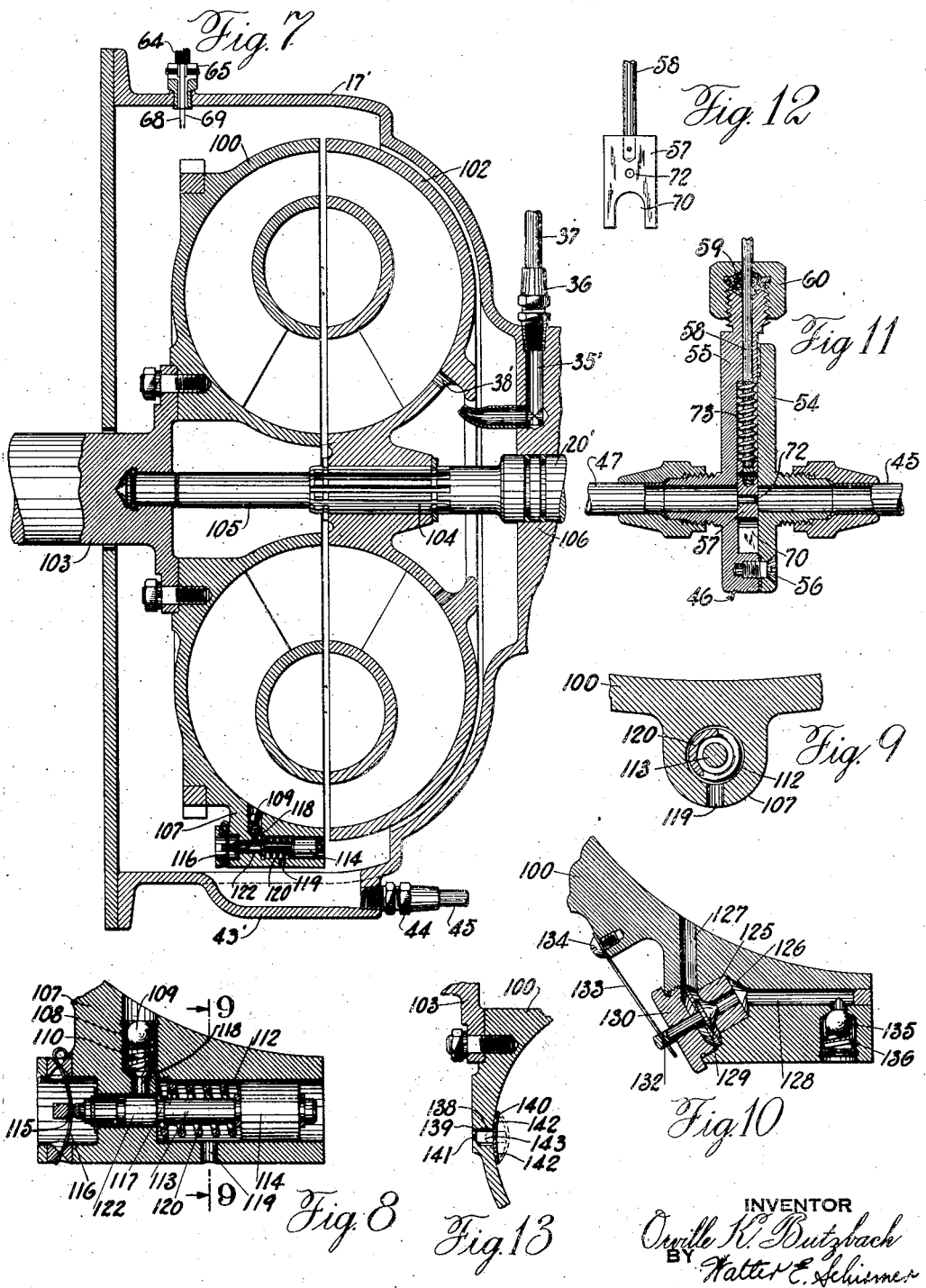

Patented Aug. 6, 1946

2,405,135

UNITED STATES PATENT OFFICE 2,405,135

TRANSMISSION

Orville K. Butzbach, South Bend, Ind., assignor to The Studebaker Corporation, South Bend, Ind., a corporation of Delaware Application July 5, 1940, Serial No. 343,938

6 Claims. (Cl. 60—54)

This invention relates to transmissions and more particularly is directed to control means for increasing the efficiency of a fluid coupling or torque converter used in conjunction with a gear box for transmitting power from the engine into the gear box to drive a vehicle such as an automobile, truck or the like.

It has been found in connection with torque converters and fluid couplings heretofore used that considerable difficulty is encountered in the operation of such members due to the fact that the fluid used under some conditions of operation heats up to a sufficient extent to, in effect, burn out the member and render it practically inoperative. This is especially true in connection with devices using a closed circuit which, when high torque is imposed through the member, produce heating of the fluid to an extent such that it loses its viscosity and consequently its torque transmitting ability.

Even in devices of the type in which an open circuit is employed the rate of flow of the fluid is sometimes insufficient to effect the desired cooling and still maintain the desired pressure within the unit.

The present invention has for one of its primary objects the provision of a fluid coupling or torque converter unit which is so designed as to provide for automatic discharge of the fluid from the unit when the temperature of the fluid reaches a predetermined point and simultaneously therewith provides for introduction into the unit, under pressure, of cooled fluid at a substantially greater rate than in normal operation to compensate for the faster rate of withdrawal required because of the increase in temperature of the fluid within the unit.

In this invention I preferably provide thermostatic means in the housing of the unit responsive to a predetermined temperature therein for opening a valve in the fluid line to provide an increased withdrawal of liquid from the unit and an increased volume of liquid to pass to the unit from the fluid reservoir and cooler. In addition, thermally responsive means within the unit itself is provided which operates when the liquid within the unit reaches a predetermined temperature to open a valve effective for dumping the heated liquid out of the unit at a much greater rate than normal leakage therethrough.

Still another feature of the present invention is the provision of a fluid reservoir arranged to function also as a cooler to insure cooling of the liquid withdrawn from the unit with the provision of an electrically controlled thermally responsive valve which functions to control the flow of fluid passing into the reservoir from the unit and thus in turn controls the delivery from the reservoir into the unit by the pump.

Other objects and advantages of the present invention will appear more fully from the following detailed description which, taken in conjunction with the accompanying drawings, will disclose to those skilled in the art the particular construction and operation of preferred forms of the present invention.

In the drawings:

Figure 1 is a somewhat diagrammatic elevational view of a power unit assembly embodying the present invention;

Figure 2 is a vertical sectional view through a torque converter unit showing the thermostatic means for controlling operation of the liquid circulating system;

Figure 3 is an enlarged detailed view of the thermally responsive valve in the impeller of the torque converter;

Figure 4 is a transverse section taken on line 4—4 of Figure 2;

Figure 5 is an elevational view of a modified form of valve construction;

Figure 6 is a plan view of the valve shown in Figure 5;

Figure 7 is a vertical sectional view through a fluid coupling including a thermally controlled valve mechanism in the impeller;

Figure 8 is an enlarged sectional view through the valve mechanism shown in Figure 7;

Figure 9 is a sectional view taken on line 9—9 of Figure 8;

Figure 10 is a sectional view of a modified form of a thermally responsive valve;

Figure 11 is a sectional view of the electrically controlled valve in the fluid return line;

Figure 12 is an elevational view of the valve gate shown in Figure 11; and

Figure 13 is a partial sectional view of a further form of the invention.

Referring now in detail to the embodiment of the invention shown in Figures 1 to 4, inclusive, the main engine or power source is indicated at 5 and may be an internal combustion engine or Diesel engine of conventional design provided with a pulley 6 carried by the crank shaft and adapted to drive, through the fan belt 13, the fan pulley 7 secured to the fan shaft carrying the fan 8. A suitable supporting bracket 9 is mounted at one side of the engine block for carrying a rotatable shaft 10 which at one end is provided with a pulley 12 driven by the fan belt 13 and at the opposite end is connected to a fluid pump 14 having an inlet connection 15 and an outlet connection 16.

Mounted rearwardly of the engine 5 and secured to the flywheel housing thereof is a housing member 17 adapted to enclose a fluid torque converter or the like, the housing member 17 having a rearward extension 18 within which is located the gearing of the transmission and out of which extends the output shaft 19 provided with the companion flange 20 of a universal joint adapted to be connected to the propeller shaft of the vehicle.

The housing 17, as shown more in detail in Figure 2, is provided internally with the stator blades 22 preferably cast integrally therewith. Cooperating therewith is the rotatable impeller 23 secured in the flanged end 24 of the shaft 25 of the engine by means of circumferentially spaced bolts 26. Preferably, the impeller member 23 is provided with a starter gear 27 whereby suitable starting mechanism can be geared thereto for turning over the engine for starting. Journaled in the recessed end 28 of the crank shaft 25 is a driven shaft 29 having a splined portion 30 upon which the hub 32 of the turbine or rotor 33. This shaft 29 extends rearwardly through a suitably journaled portion 34 formed in the housing 17 and thence into the transmission portion 18 of the housing. The operation of the torque converter in and of itself is more or less conventional and therefore no detailed description of its construction or operation is believed necessary, since the present invention is equally applicable to all standard types of torque converters.

The housing 17 is provided with an inlet passageway 35 connected through the nipple 36 to a fluid input line 37 connected at 16 to the outlet side of the pump 14. From the passageway 35 fluid under pressure is introduced through the port 38 into the chamber 39 and thence finds its way through the passageway 40 into the interior of the torque converter. Obviously, if the torque converter rotates to drive the shaft 29 a certain portion of this fluid is discharged centrifugally through the outlet indicated generally at 42 and thence runs downwardly into the sump or recess 43 formed at the lower end of the housing 17. A suitable outlet connection 44 is provided for the sump 43 and fluid is conducted through the conduit 45 to the inlet side of a valve generally indicated at 46. From the valve 46 a suitable conduit 47 conducts the fluid into the upper end of a fluid reservoir 48 mounted in any suitable manner on the side of the engine block. The reservoir 48 has a drain plug 49 for withdrawing sediment therefrom, and is also provided with an outlet connection 50 extending through a conduit 52 to the inlet connection 15 on the pump 14. The reservoir 48 is preferably provided with radially extending fins 53 which act as heat dissipating means for maintaining the fluid within the reservoir relatively cool. Similarly, the entire piping for the unit enclosed within the housing 17 is disposed at the side of the engine block where it will be subjected to air passing over the engine and consequently maintained cool.

Considering now Figures 11 and 12, the valve 46 includes a valve body formed into cooperating halves 54 and 55 which are suitably closed by means of screws 56. Within the valve body there is mounted a sliding valve member or gate 57, shown more in detail in Figure 12, having a valve stem or guide 58 extending outwardly through the packing 59 carried within the nut 60. The stem 58 is adapted to extend into a solenoid 62 which has one terminal of the coil thereof connected to ground through the conductor 63 and the opposite terminal thereof connected through the conduit 64 to the thermally sensitive member 65 and through the switch 66 to the battery 67.

The switch 66 may be a conventional ignition switch or the like and the thermally sensitive member 65 as shown in Figure 7 may be provided with a pair of contact members 68 and 69 extending into the interior of the housing 17 and formed of suitable bimetal or the like so as to warp into contact in response to a predetermined temperature within the housing. This closes the circuit between the battery 67 and the solenoid 62 energizing the solenoid and thereby exerting an upward lifting force on the valve stem 58. The valve member 57, as shown clearly in Figure 12, has a slotted or bifurcated end portion defining the opening 70 and is also provided with an aperture 72.

The aperture 72 in normal position of the valve is disposed in the valve passageway 39 as to provide for metered flow of fluid from the conduit 45 to the conduit 47. Upon energizing of the solenoid the valve is raised against the pressure of the spring 73 encircling the valve stem, thereby moving the slotted portion 70 into the passageway to provide a full open port between the conduits 45 and 47, thereby allowing the pump to withdraw the maximum amount of fluid from the sump 43 in the housing 17.

Considering now in detail the valve members carried by the impeller 23, of which three or four may be provided about the periphery of the impeller, each valve member comprises a valve body portion 75 secured to the interior of the radially outer periphery of the impeller by means of cap bolts 76. It is to be understood that the valves may be arranged adjacent the hub of the impeller, as shown in Figure 13. The valve body 75 is provided with a radially extending port or passageway 77 which is counterbored as indicated at 78 to receive a ball check valve 79 normally held closed by the spring 80. Disposed radially inwardly of the ball check valve 79 is a rotatable valve plug 82 which projects laterally of the valve body 75 and has its projecting end 83 connected to a coiled thermally responsive element 74. The element 84 is adapted to expand and contract in response to temperature changes thereby exerting a rotative force upon the end 83 of the plug 82, thus rotating the valve plug from a position in which the passageway 85 thereof is disposed crossways of the valve passageway 77 into the position shown in Figure 3 in which the valve port is open. Opening of this valve port when the impeller is rotating at relatively high speed results in oil passing radially outwardly through the passageway 77 and, due to the centrifugal force, the ball check valve 79 is displaced radially outwardly from its seat against the pressure of the spring allowing discharge of fluid from the interior of the torque converter radially outwardly through the valve and consequently into the sump 43.

Preferably the system is so designed that the thermally sensitive element 65 will energize the circuit to the solenoid 62 to open the valve 66 either simultaneously with or slightly prior to movement of the valve plug 82 into open position. As the valve plug moves to open position and the fluid is discharged from the torque converter into the conduit 45 the pump will be capable of withdrawing an increased volume of fluid, cooling the same in the reservoir 48 and then forcing this increased volume of fluid back to the torque converter through the passageway 35 and port 38.

In the valve construction shown in Figures 5 and 6 the impeller 23 is provided with a series of circumferentially spaced radial ports 90 communicating with the interior thereof. The ports 90 are adapted to be normally closed by means of rotatable valve member 92 which valve member is provided with port openings 93 adapted, when rotated about the pin 94, to aline with the openings 90 providing discharge of fluid from the interior of the torque converter through the alined openings 90 and 93 into the sump 43.

To produce this rotation the valve member 92 is provided with means for receiving the end 95 of a coiled thermally responsive element which at its opposite end is anchored to the pin 94, this pin being secured in the impeller 23 with the valve member 92 being rotatable with respect thereto. Upon heating of the fluid within the impeller the element 96 tends to expand thereby tending to wrap itself in a clockwise direction about the pin 94. As a result, the end 95 imposes a rotating thrust on the valve body 92 moving its openings 93 into alinement with the ports 90 in the impeller thereby providing for discharge of the fluid from within the torque converter.

It is apparent that either of the valve mechanisms shown in Figures 3 and 4, or 5 and 6 can be provided in the torque converter shown in Figure 2.

In Figures 7 to 9 I have disclosed a fluid coupling arrangement embodying the present invention. In this form the housing 17' encloses the impeller 100 and the rotor 102 forming the component parts of the fluid coupling. The impeller 100 is bolted or otherwise secured to the flanged end of the crankshaft 103 of the engine while the rotor 102 is splined, as indicated at 104, to the driven shaft 105 journaled at its forward end in a recessed portion of the crankshaft 103 and at its opposite end 20' in the web 106 of the housing 17' to extend into the transmission. Fluid from the outlet side of the pump is conducted through the conduit 37 and fitting 36 into the coupling through the passageway 35' and ports 38' in the rotor. At its lower end the housing 17' is provided with a sump 43' connected to the fitting 44 of the conduit 45.

The impeller 100 is provided adjacent its radial periphery with a series of boss portions 107 in each of which is formed a valve passageway 108, as shown in detail in Figure 8, this passageway being normally closed by a ball check valve 109 held in position by the spring 110. Disposed in a position normal to the passageway 108 is a recessed portion 112 in which is mounted a valve stem member 113 having a collar or piston 114 slidably supported in the passageway 112. The opposite end of the valve stem 113 is provided with a slotted opening 115 within which is disposed the central portion of an arcuate bimetallic thermally responsive member 116 which at a predetermined temperature is adapted to warp in the opposite direction thereby moving the valve stem 113 to the left as viewed in Figure 8, causing the reduced portion 117 thereof to move into alinement with the reduced passageway 118 leading from the valve port 108 and providing for discharge of fluid from the passageway 108 into the recess 112. From the recess 112 the fluid is discharged through the port 119 into the sump 43'. A suitable spring 120 is provided to normally maintain the bushing or collar 122 on the valve stem 113 in position, blocking the passage 118 but this spring is insufficient to resist the biasing force of the thermally responsive element 116 when the predetermined temperature has been reached. It is to be understood, of course, that centrifugal force will move the ball check valve 109 away from its seat to open the passageway 108 to the interior of the coupling.

In Figure 10 I have shown a modified form of valve which is disposed at a slight angle with respect to the axis of the impeller 100. In this form of the invention a suitable valve seat 125 is disposed in a bored out portion 126 located between the valve passageways 127 and 128. A suitably headed valve member 129 carried in the bushing 130 for sliding movement engages the valve seat 125 to normally close communication between passageways 127 and 128. However, the outer end of the valve member 129 indicated at 132 is connected to the bimetallic thermally responsive element 133 anchored by the screws 134 to the impeller. Upon warping of the element 133 in response to a predetermined temperature the valve 129 is moved away from the seat 125 and allows discharge of fluid from the interior of the impeller through the passageways 127 and 128 to the ball check valve 135. The check valve 135 is spring pressed into closed position but centrifugal force will displace it from its seat and allow the discharge of fluid outwardly through the passageway 136 to the sump 43'.

In Figure 13 I have provided a structure which may be embodied in the impeller adjacent its hub portion in place of the peripheral portion. One of the advantages of such a location is the fact that no check valve is necessary to counteract the centrifugal force. It is to be understood that while the valve structure in all of the forms of the invention is disclosed as being located on the impeller it may be located on either the rotor or stator, if so desired.

Considering Figure 13 in detail, the impeller 100 is bolted to the crank shaft 103, as previously described. Adjacent this connection the impeller is provided with a bore 138 having a tubular seat portion 139 and a valve passageway 141 leading to the outside of the unit. Disposed over the bore is a circular disk 140 formed of a bimetal material which is provided with several apertures 142 for permitting oil or fluid to pass therethrough into the bore 138. The disk 140 may be brazed or otherwise secured to the inner wall of the impeller and is provided with the extending valve stem 143 normally adapted to have seating engagement at the free end thereof on the valve seat 139. The bimetallic disk 140, when subjected to a predetermined temperature, snaps from the position shown into a concave position indicated by dotted lines, thus opening the valve bore 141 allowing the discharge of fluid from the unit therethrough. Such disks are well known and are sold under the trade name of "Klixon" and can be designed to snap from one position to the other at any desired temperature. With such a construction the snap action of the valve eliminates any possibility of chattering or the like and at all times that the temperature within the unit is below the predetermined point the tension in the disk 140 will serve to press the valve firmly against its seat.

It is therefore believed apparent that I have provided a novel thermally responsive control for insuring the maintenance of the proper temperature of the oil within the torque converter or fluid coupling thereby maintaining the same efficient regardless of torque and heat produced therein.

I am aware that various changes may be made in certain details of the present invention and I therefore do not intend to be limited except as defined by the scope and spirit of the appended claims.

I claim:

1. In combination, an engine, a fluid torque transmitting unit driven from said engine, a fluid circuit for said unit including a cooling reservoir and a pump, a valve in said circuit externally of said unit having means for varying the flow of fluid therethrough, electrically operable means for actuating said valve, thermally responsive means in said unit for energizing said actuating means, and secondary thermally responsive valve means in said unit for increasing the rate of discharge of fluid from said unit upon a predetermined rise in temperature of said fluid.

2. In a unit having fluid connected driving and driven members, a valve passageway in the periphery of one of said members, a centrifugally controlled check valve in said passageway, a second valve in said passageway normally closing the same, and a thermally responsive element for opening said second valve.

3. In a unit having fluid connected driving and driven members, a valve passageway in the periphery of one of said members, a centrifugally controlled check valve in said passageway, a second valve in said passageway normally closing the same, and a thermally responsive element for opening said second valve, said second valve being disposed anterior to said check valve in said passageway.

4. In a unit having fluid connected driving and driven members, a valve passageway in the periphery of one of said members, a centrifugally controlled check valve in said passageway, a second valve in said passageway normally closing the same, and a thermally responsive element for opening said second valve, said second valve being located on the outlet side of said check valve.

5. In a unit having fluid connected driving and driven members, a valve passageway in the periphery of one of said members, a centrifugally controlled check valve in said passageway, a second valve in said passageway normally closing the same, and a thermally responsive element connected to rotate said second valve to open position under predetermined temperatures in said unit.

6. In a unit having fluid connected driving and driven members, a valve passageway in the periphery of one of said members, a centrifugally controlled check valve in said passageway, a second valve in said passageway normally closing the same, and a thermally responsive element connected to shift said second valve axially to valve-open position upon said fluid reaching a predetermined temperature.

ORVILLE K. BUTZBACH.